United States Patent
Lin

(10) Patent No.: US 9,897,725 B2
(45) Date of Patent: Feb. 20, 2018

(54) DUAL VIEW FIELD DISPLAY PANEL AND DUAL VIEW FIELD DISPLAY APPARATUS

(71) Applicant: BOE TECHNOLOGY GROUP CO., LTD., Beijing (CN)

(72) Inventor: Chia Chiang Lin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/106,632

(22) PCT Filed: Jul. 27, 2015

(86) PCT No.: PCT/CN2015/085175
§ 371 (c)(1),
(2) Date: Jun. 20, 2016

(87) PCT Pub. No.: WO2016/150054
PCT Pub. Date: Sep. 29, 2016

(65) Prior Publication Data
US 2017/0108629 A1    Apr. 20, 2017

(30) Foreign Application Priority Data
Mar. 25, 2015 (CN) .......................... 2015 1 0131956

(51) Int. Cl.
*G02B 5/18* (2006.01)
*G02F 1/1335* (2006.01)

(52) U.S. Cl.
CPC ......... *G02B 5/1814* (2013.01); *G02B 5/1866* (2013.01); *G02F 1/133504* (2013.01)

(58) Field of Classification Search
USPC ..................... 362/97.2; 349/15, 62, 122, 153
See application file for complete search history.

(56) References Cited

U.S. PATENT DOCUMENTS

2010/0110316 A1* 5/2010 Huang .............. G02F 1/134309
349/15
2010/0283924 A1* 11/2010 Lee ................... G02F 1/133308
349/15

(Continued)

FOREIGN PATENT DOCUMENTS

CN    101655622 A    2/2010
CN    101750785 A    6/2010

(Continued)

OTHER PUBLICATIONS

First Chinese Office Action, for Chinese Patent Application No. 201510131956.X, dated Feb. 20, 2017, 12 pages.

(Continued)

*Primary Examiner* — Allyson Trail
(74) *Attorney, Agent, or Firm* — Kinney & Lange, P.A.

(57) ABSTRACT

Embodiments of the present application provide a dual view field display panel and a dual view field display apparatus. The dual view field display panel includes first display regions and second display regions alternatively arranged in a row direction and/or a column direction. The dual view field display panel further includes a first substrate; a second substrate arranged opposite to the first substrate; a grating structure between the first substrate and the second substrate. The grating structure includes a first grating layer made of metal and located within the first substrate, and the first grating layer is provided at one side of the first substrate facing the second substrate.

17 Claims, 3 Drawing Sheets

(56) References Cited

U.S. PATENT DOCUMENTS

| | | | | |
|---|---|---|---|---|
| 2010/0321621 A1* | 12/2010 | Kikuchi | ............... | G06F 3/044 |
| | | | | 349/122 |
| 2013/0050611 A1* | 2/2013 | Parry-Jones | ...... | G02F 1/133512 |
| | | | | 349/62 |
| 2014/0043549 A1* | 2/2014 | Taniguchi | ........... | G02F 1/13394 |
| | | | | 349/15 |
| 2014/0293212 A1* | 10/2014 | Osaki | ............... | G02F 1/133351 |
| | | | | 349/153 |
| 2014/0346511 A1* | 11/2014 | Wu | ................... | G02F 1/136286 |
| | | | | 257/48 |

FOREIGN PATENT DOCUMENTS

| | | |
|---|---|---|
| CN | 202330954 U | 7/2012 |
| CN | 102768424 A | 11/2012 |
| CN | 202631914 U | 12/2012 |
| CN | 104317060 A | 1/2014 |
| CN | 104317060 A | 1/2015 |
| CN | 104656307 A | 5/2015 |
| JP | 2008008934 A | 1/2008 |

OTHER PUBLICATIONS

International Search Report and Written Opinion (including English translation) dated Jan. 12, 2016, for corresponding PCT Application No. PCT/CN2015/085175.

* cited by examiner

DUAL VIEW FIELD DISPLAY PANEL AND DUAL VIEW FIELD DISPLAY APPARATUS

CROSS-REFERENCE TO RELATED APPLICATION

This application claims the benefit of Chinese Patent Application No. 201510131956.X filed on Mar. 25, 2015 entitled "Dual View Field Display Panel and Dual View Field Display Apparatus" in the State Intellectual Property Office of China, the whole disclosure of which is incorporated herein by reference.

BACKGROUND OF THE INVENTION

Field of the Invention

The present application relates to the technical field of display, and particularly, to a dual view field display panel and a dual view field display apparatus.

Description of the Related Art

In an existing dual view field display technique, gratings (in cell BM gratings) are manufactured within a liquid crystal cell of a liquid crystal display, and it adopts a multilayer micro grating structure. In other words, the multilayer micro grating structure is made between a glass substrate and a pixel unit within a display cell. The dual view field display panel with the micro grating structure can not only reduce the process difficulty for manufacturing the dual view field display panel, can but also effectively control an angle at which light rays are transmitted.

FIG. 1 is a schematic view for showing a structure of a dual view field display panel with the micro grating structure in the prior art. As shown in FIG. 1, the dual view field display panel includes a first substrate 101 and a second substrate 102 arranged opposite to each other, and it also includes first display regions 103 and second display regions 104 alternatively arranged. The first display region 103 can only be seen from a first view field and the second display region 104 can only be seen from a second view field. Specifically, a grating structure is provided on one side of the first substrate 101 facing the second substrate 102, and first display units 105 corresponding to the first display regions 103 and second display units 106 corresponding to the second display regions 104 are provided between such grating structure and the second substrate 102. As shown in FIG. 1, the grating structure includes two light shielding layers 107, 108, which are spaced apart from each other by a transparent spacer layer 109. Further, a first light shielding layer 107 includes a plurality of first light transmission areas 1071 and a plurality of first light shielding units 1072 arranged to be spaced apart, and similarly, a second light shielding layer 108 includes a plurality of second light transmission areas 1081 and a plurality of second light shielding units 1082 arranged to be spaced apart. In addition, the first light shielding layer 107 and the second light shielding layer 108 respectively may further include first spacing light shielding units 1073 and second spacing light shielding units 1083 located at a spacing area between respective two adjacent display units.

However, the dual view field display panel with the micro grating structure in the prior art has a lower aperture opening ratio than a conventional display. Therefore, there is one problem on how to improve a utilization rate of backlights. Further, there is still a problem in the prior art on how to simplify manufacturing process of the dual view field display panel.

SUMMARY

The present application is intended to overcome or alleviate at least one or more technical problems present in the prior art.

At least one object of the present application is to provide a dual view field display panel, which can improve a utilization rate of backlights, and simplify the manufacturing process.

At least one object of the present application is to provide a dual view field display apparatus, which can improve a utilization rate of backlights, and simplify the manufacturing process.

In accordance with one aspect of the present application, it provides a dual view field display panel, including first display regions and second display regions alternatively arranged in a row direction and/or a column direction, wherein the dual view field display panel further includes:

a first substrate;

a second substrate arranged opposite to the first substrate;

a grating structure between the first substrate and the second substrate;

wherein the grating structure includes a first grating layer made of metal and located within the first substrate, and the first grating layer is provided at one side of the first substrate facing the second substrate.

In one example, the grating structure further includes a second grating layer, which is provided at one side of the second substrate facing the first substrate.

In one example, the number of the second grating layer is one or more, wherein a first transparent spacer layer is provided between the second grating layer and the first grating layer, and when the number of the second grating layer is more than one, a second transparent spacer layer is provided between any two adjacent ones of the second grating layers.

In one example, the dual view field display panel further including first display units and second display units, which correspond to the first display regions and the second display regions respectively and are located between the first grating layer and the first transparent spacer layer.

In one example, the first grating layer includes a plurality of first light transmission areas and a plurality of first light shielding units arranged to be spaced apart from each other, and the first light transmission areas are configured to transmit a light from a backlight source through the first light transmission areas and the first light shielding units are configured to reflect the light from the backlight source.

In one example, the first light shielding unit in the first grating layer is formed by a metal layer deposited on the first substrate through a patterning process.

In one example, the first grating layer further includes a first spacing light shielding unit for spacing apart the first display region and the second display region.

In one example, the first spacing light shielding unit is formed by the metal layer by a same patterning process.

In one example, the second grating layer includes a plurality of second light transmission areas and a plurality of second light shielding units arranged to be spaced apart from each other, wherein the second light transmission areas are configured to pass the light from the backlight source through the second light transmission areas and the second light shielding units are configured to reflect the light from the backlight source.

In one example, the second grating layer further includes a second spacing light shielding unit for spacing apart the first display region and the second display region.

In one example, the second light shielding unit and the second spacing light shielding unit are formed by black resin or black metal.

In one example, the first substrate is an array substrate, and the second substrate is a color filter substrate.

In one example, the dual view field display panel adopts TN type of pixels.

In one example, the first grating layer is located in a layer where a common electrode wiring between a glass substrate and an ITO pixel electrode layer of the array substrate and a gate of corresponding TFT transistors are located.

In one example, patterns of the common electrode wiring, the gate and the first grating layer are formed by a metal layer through a same lithographic process at one time; wherein the gate and the common electrode wiring are also used as the first light shielding unit, and the first light shielding unit of the first grating layer is electrically connected with an ITO common electrode of the dual view field display panel; or the first light shielding unit and the common electrode wiring are independent from each other, and the first light shielding unit is electrically connected with a pixel electrode of the dual view field display panel.

In one example, the dual view field display panel adopts ADS type of pixels.

In one example, the first grating layer is an additional metal layer provided between a glass substrate and an ITO pixel electrode layer of the array substrate, except an ITO common electrode layer.

In one example, the additional metal layer is a metal layer where a gate or a signal line is located.

In one example, patterns of the first grating layer and the gate or the signal line are formed by a same metal layer during a same patterning process, wherein the gate or the signal line is also used as the first light shielding unit, and the first light shielding unit in the first grating layer is electrically connected with the ITO common electrode or the ITO pixel electrode.

In accordance with another aspect of the present application, it provides a dual view field display apparatus, including the dual view field display panel as described above.

The present application can achieve at least the following technical effects:

with the dual view field display panel and the dual view field display apparatus provided by the present application, the grating layer is integrated with a metal layer separately disposed within the array substrate or an existing metal layer, or the lower grating layer is replaced by the metal layer on the array substrate. On the basis that the light transmission direction is under the control, the metal layer in the array substrate is used to reflect the light back to the backlight module, thereby obtaining a better utilization rate of the backlights. In addition, it can simplify the manufacturing process by forming the lower grating layer of the metal layer in the array substrate.

BRIEF DESCRIPTION OF THE DRAWINGS

In order to better understand the above objectives, other objectives, features and advantages of the present application, the present application is discussed in detail in conjunction with the following drawings and the specific embodiments.

DETAILED DESCRIPTION OF THE EMBODIMENTS

Specific embodiments of the present application will be described in detail below, and examples thereof are shown in the attached drawings. The same reference numbers indicate the same or similar elements throughout the text. The specific embodiments described with reference to the attached drawings are illustrative and intended to interpret the present application, rather than limiting it.

The present application provides a dual view field display panel, which includes first display regions and second display regions alternatively arranged in a row direction and/or a column direction. The dual view field display panel also includes a first substrate and a second substrate arranged opposite to each other; a grating structure located between the first substrate and the second substrate, wherein the grating structure includes a first grating layer, provided at one side of the first substrate facing the second substrate and made of metal.

The grating structure may also include a second grating layer, which is provided at one side of the second substrate facing the first substrate. In some embodiments, the number of the second grating layer is one, and a transparent spacer layer is provided between the second grating layer and the first grating layer. In other embodiments, a plurality of the second grating layers are provided, and the transparent spacer layer is provided between any adjacent two of the second grating layers. In some embodiments, the first grating layer is a layer provided between a glass substrate of an array substrate and an ITO pixel electrode layer (for example, a wiring metal layer of common electrode). In other embodiments, the first grating layer is an additional metal layer provided between a glass substrate of an array substrate and an ITO pixel electrode layer, except a common electrode layer. In such case, the additional metal layer may be located at a layer different from the common electrode layer.

As compared to the prior art, the present application provides a dual view field display panel and a dual view field display apparatus, in which the first grating layer (for example a lower grating layer) and a certain metal layer of the array substrate are integrated into one piece, or the lower grating layer is formed by a metal layer on the array substrate for forming other devices. On the basis that the light transmission direction is under the control, the lights are reflected back to a backlight module by the metal layer for forming the first grating layer in the array substrate, thereby obtaining a better utilization rate of backlights. In addition, the grating layer is formed by the metal layer in the array substrate, and the manufacturing process is simplified.

The above proposed technical solution by the present application is described in combination with the specific embodiments.

Figure 1:
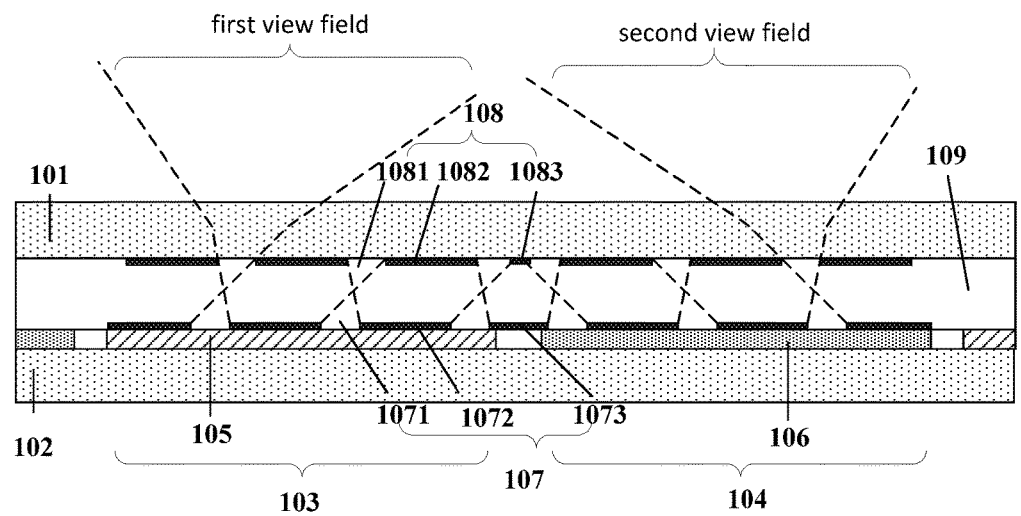
FIG. 1 is a schematic view for showing a structure of a dual view field display panel with a micro grating structure in the prior art.
Figure 2:
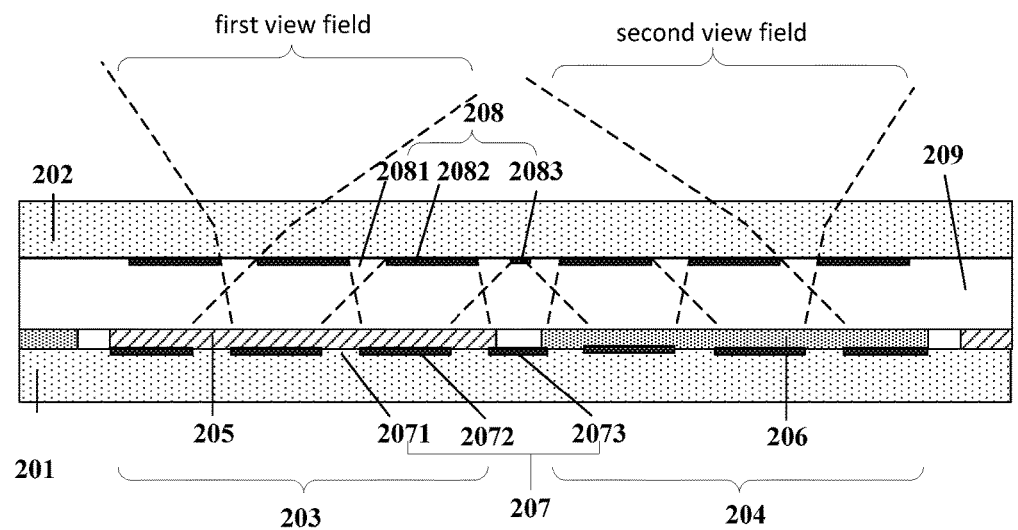
FIG. 2 is a schematic view for showing a structure of a dual view field display panel in accordance with an embodiment of the present application.

FIG. 2 is a schematic view for showing a structure of a dual view field display panel in accordance with one embodiment of the present application. As shown in FIG. 2, the dual view field display panel includes a first substrate 201 and a second substrate 202 arranged opposite to each other, and first display regions 203 and second display regions 204 arranged alternatively in a row direction and/or a column direction, and a grating structure is provided between the first substrate 201 and the second substrate 202.

The first display region 203 can only be seen from a first view field, and the second display region 204 can only be seen from a second view field. Specific positions of the first view field and the second view field can be determined as actually required. It is common to include a left view field and a right view field. In a part of the display panels, the first view field is disposed to be a middle view field and the second view field is disposed to be a left view field or a right view field, or the like.

In the dual view field display panel provided by the present application, as shown in FIG. 2, the grating structure at least includes a first grating layer 207 in the first substrate 201, which is formed by a metal layer for forming other device or specially designed in the first substrate 201 and provided at one side of the first substrate 201 facing the second substrate 202. The grating structure also includes a second grating layer 208, provided at one side of the second substrate 202 facing the first substrate 201. First display units 205 corresponding to the first display regions 203 and second display units 206 corresponding to the second display regions 204 are provided between transparent spacer layers of the first grating layer 207 and the second grating layer 208 of the grating structure.

It should be noted that the grating structure of the present application adopts a multilayer slit grating structure, i.e., including a plurality of light shielding layers. FIG. 2 shows a typical bi-layer slit grating structure. As shown in FIG. 2, the grating structure includes two grating layers 207 and 208, which are spaced apart by a transparent spacer layer 209 and the first and second display units 205, 206. A distance between any adjacent two grating layers is determined by a thickness (or thicknesses) of the transparent spacer layer 209 and/or the first and second display units 205, 206. It can be adjusted according to actual deign needs. Of course, although the grating structure disclosed in the above embodiment consists of a bi-layer grating structure, the present application is not limited to this. The grating structure as disclosed by the present application is also applicable into a grating structure with more than two layers. For example, with the grating structure with two layers as described above, it is possible to add one grating layer or more grating layers between the two layers of the grating structure, and the transparent spacer layer is disposed between any adjacent two of the second grating layers. With such structure, the outermost two layers of the grating structure can be designed by the same designing principle as those described in the above embodiment, and the one layer ore more grating layers can be feasible as long as it (they) does (do) not block any light rays transmitted from respective light transmission areas.

As shown in FIG. 2, the first grating layer 207 includes a plurality of first light transmission areas 2071 and a plurality of first light shielding units 2072 arranged to be spaced apart, wherein the first light transmission area 2071 is configured to transmit the light from the backlight source, while the first light shielding unit 2072 is configured to reflect back the light from the backlight source. Similarly, the second grating layer 208 includes a plurality of second light transmission areas 2081 and a plurality of second light shielding units 2082 arranged to be spaced apart. As such, the second light transmission area 2081 is configured to transmit the light, while the second light shielding unit 2082 is configured to block the transmission of the light. The light emitted from each first light transmission area 2071 transmits through the first display unit 205 or the second display unit 206, and outgoes from the second light transmission area 2081 corresponding to the first light transmission area 2071.

Of course, according to the design requirement, the first grating layer 207 and the second grating layer 208 respectively may further include first spacing light shielding units 2073 and second spacing light shielding units 2083, and the first spacing light shielding unit 2073 is located at a spacing region between two display units, and the second spacing light shielding unit 2083 is arranged corresponding to the first spacing light shielding unit 2073. The first spacing light shielding unit 2073 and the second spacing light shielding unit 2083 are used to reduce light crosstalk between two view fields.

Furthermore, the first and second light shielding units 2072, 2082 and the first and second spacing light shielding units 2073, 2083 are made of light shielding materials, for example, the second light shielding unit 2082 and the second spacing light shielding unit 2083 are made of black resin, or the first light shielding unit 2072 and the first spacing light shielding unit 2073 are made of black metal, or the like. The first light transmission regions 2071 and the second light transmission regions 2081 are formed by gaps which are generated by spacing apart and arranging the first light shielding units 2072 and the second light shielding units 2082.

According to the present application, the first grating layer 207 is made of the metal layer in the first substrate. This can not only reflect back the light to the backlight module by the metal layer, thereby obtaining a better utilization rate of the backlights, but also can leave out a manufacture procedure for separately manufacturing the first grating layer, thereby simplifying the manufacture procedure.

In other words, it can form patterns of the common electrode wiring and the first grating layer at the same time by the same one lithographic process or patterning process, after depositing the metal layer of for example the common electrode wiring layer onto the array substrate. Of course, it can separately form a metal layer at one layer other than the common electrode layer, and the metal layer is formed into the first grating layer by the patterning process.

With the micro grating structure provided by the present application, the first grating layer is formed by the metal layer in the first substrate (preferably, the metal layer in the array substrate); and the second substrate is correspondingly a color filter substrate. For example, the metal layer is an electrode metal layer provided between the glass substrate and the ITO pixel electrode layer of the array substrate.

Figure 3:
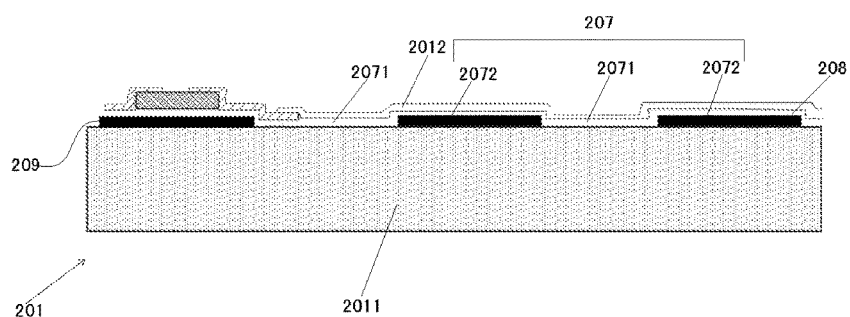
FIG. 3 is a schematic view for showing a structure of an array substrate in a dual view field display panel in accordance with an embodiment of the present application, wherein the dual view field display panel adopts an arrangement of TN type pixel structure.

FIG. 3 is a schematic view for showing a structure of the array substrate 201 in the dual view field display panel in accordance with an embodiment of the present application. As shown in FIG. 3, the dual view field display panel adopts TN (Twisted-Nematic) type of pixels. Specifically, the array substrate 201 includes a glass substrate 2011, an ITO pixel electrode 2012 provided on the glass substrate 2011, and a common electrode wiring layer between the glass substrate 2011 and the ITO pixel electrode 2012. The first grating layer 207 and the common electrode wiring layer are integrated into one piece. In other words, during the patterning process, the first grating layer 207, a gate 209 and common electrode wirings are formed by the same one metal layer at the same time. In the design concept of the present application, the metal part labeled as 209 can function as both the gate and the first light shielding unit; the metal part labeled as 2072 can function as both the first light shielding unit and the common electrode wiring. Specifically, the first light shielding unit 2072 in the first grating layer 207 and the first spacing light shielding unit (not shown) for spacing apart the display units are integrated with the common electrode wirings and the gate 209. The first light transmission regions 2071 are formed at the gaps between any two of the first light shielding units 2072 and the first spacing light shielding units. The first grating layer 207 is electrically insulated from a pixel electrode 2012 by an insulation layer 208. In addition, since the first light shielding unit 2072 of the first grating layer 207 is electrically connected with the common electrode layer, and arranged between the glass substrate 2011 and the ITO pixel electrode 2012, this would not affect an electric field of a liquid crystal layer. Specifically, the first light shielding unit 2072 of the first grating layer 207 and/or the first spacing light shielding unit are/is electrically connected with the ITO common electrode.

Alternatively, a pattern of the first grating layer 207 and a pattern of the common electrode wiring can be separately formed from the same metal layer by the same one patterning process. In this way, the first grating layer 207 (first light shielding unit 2072 and/or first spacing light shielding unit) can also be electrically connected with the ITO pixel electrode 2012.

Figure 4:
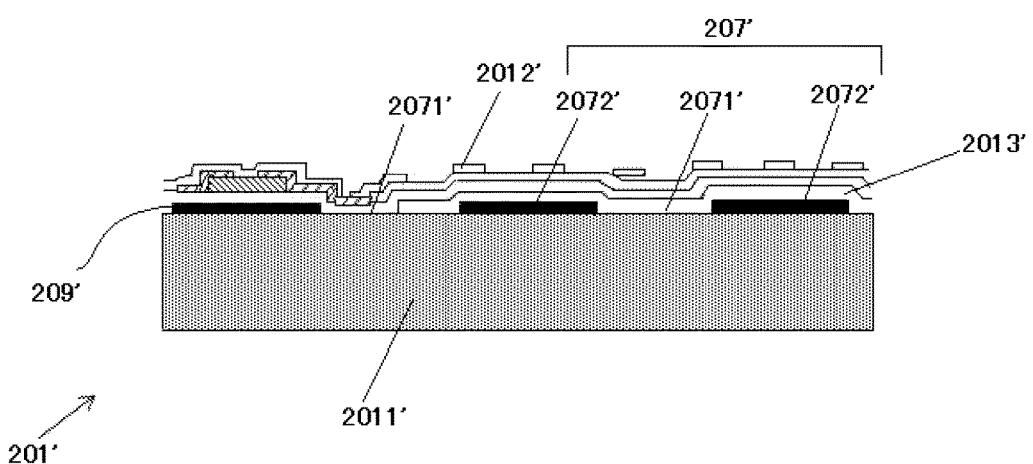
FIG. 4 is a schematic view for showing a structure of an array substrate in a dual view field display panel in accordance with another embodiment of the present application, wherein the dual view field display panel adopts an arrangement of ADS type pixel structure.

FIG. 4 is a schematic view for showing a structure of an array substrate 201' in a dual view field display panel in accordance with another embodiment of the present application. As shown in FIG. 4, the dual view field display panel adopts ADS (Advanced Super Dimension Switch) type of pixels. Specifically, the array substrate 201' includes a glass substrate 2011', an ITO pixel electrode 2012' provided on the glass substrate 2011', and an ITO common electrode 2013' between the glass substrate 2011' and the ITO pixel electrode 2012'. The first grating layer 207' and an additional metal layer (for example, one where a gate is located or one where a signal line is located) in the array substrate 201' are integrated into one piece. In other words, during the patterning process, the first grating layer 207' and the gate 209' or the signal line are formed by the same metal layer at the same time. Specifically, the first light shielding unit 2072' of the first grating layer 207' and the first spacing light shielding unit (not shown) for spacing apart the display units are integrated with the gate or the signal line within the additional metal layer. The first light transmission regions 2071' are formed at gaps between any two of the first light shielding units 2072' and the first spacing light shielding units. The gate 209' of a TFT transistor is located at a same layer as the first grating layer 207'. In addition, since the first grating layer 207' is electrically connected with the ITO common electrode 2013' and provided between the glass substrate 2011' and the ITO common electrode 2013', this would not affect an electric field between the ITO common electrode 2013' and the ITO pixel electrode 2012'. Specifically, the first light shielding unit 2072' and/or the first spacing light shielding unit of the first grating layer 207' are/is electrically connected with the ITO common electrode 2013' or the ITO pixel electrode 2012' (it should be noted that the ITO common electrode 2013' and the ITO pixel electrode 2012' are insulated from each other by an insulation layer or other associated device layers).

It can be apparent that the first grating layer or the lower grating layer is formed by the metal layer in the array substrate. On the basis that the light transmission direction is under the control, the metal layer in the array substrate is used to reflect light back to the backlight module, thereby obtaining a better utilization rate of backlights. In addition, this can simplify the manufacturing process.

Of course, in accordance with other embodiments of the present application, the metal layer is alternatively another additional metal layer (not shown), provided between the glass substrate of the array substrate and the ITO pixel electrode layer, except the common electrode layer. In addition, the additional metal layer can be transparent or opaque, for example be made of black metal.

It should be noted that in the present application, the first grating layer or the lower grating layer is made of the metal layer on the array substrate or replaced by it, other grating layers can be made by any suitable light shielding materials (black resin or black metal) as required.

Figure 5:
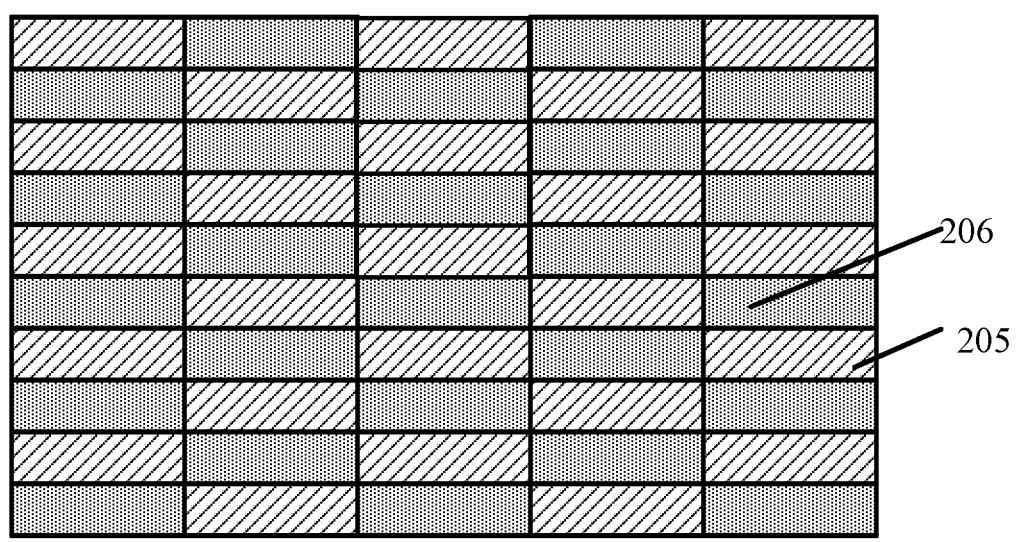
FIG. 5 is a schematic view of display pixels in a form of a grid arrangement within the dual view field display panel in accordance with an embodiment of the present application.

In addition, with the dual view field display panel provided by the present application, as shown in FIG. 5, the display units are arranged in a form of grid, that is, the first display units 205 and the second display units 206 are alternatively arranged in a row direction and a column direction, so that this will further improve display uniformity of the display panel.

Meanwhile, the present application also provides a dual view field display apparatus having the dual view field display panel as described above.

As compared to the prior art, with the dual view field display panel and the dual view field display apparatus provided by the present application, the first grating layer or the lower grating layer is formed by the metal layer in the array substrate, and thus the first grating layer or the lower grating layer can be integrated with the metal layer provided on the array substrate. Since the first grating layer or the lower grating layer is the metal layer, it can reflect back to the backlight module the light which cannot be transmitted through it, thereby obtaining a better utilization rate of the backlights. In addition, it can simplify the manufacturing process.

The objectives, technical solutions and the advantageous effects of the present application are further described in detail with reference to the above specification embodiments. It should be understood that the above embodiments are on example of the present application, and are not used to limit the present application. It should be noted that various modifications and changes may be made to the present disclosure by those skilled in the art without departing from the principles and spirit of the present application. As such, these modifications and changes to the present application are also intended to be included within the present application if they fall within the scopes of the present application defined by claims and equivalents thereof.

What is claimed is:

1. A dual view field display panel, comprising first display regions and second display regions alternatively arranged in a row direction and/or a column direction, wherein the dual view field display panel further comprises:

a first substrate;

a second substrate arranged opposite to the first substrate; and a grating structure between the first substrate and the second substrate;

wherein the grating structure comprises a first grating layer made of metal and located within the first substrate, and the first grating layer is provided at one side of the first substrate facing the second substrate;

wherein the first grating layer comprises a plurality of first light transmission areas and a plurality of first light shielding units arranged to be spaced apart from each other, and the first light transmission areas are configured to transmit a light from a backlight source through the first light transmission areas and the first light shielding units are configured to reflect the light from the backlight source; and wherein the grating structure further comprises a second grating layer, which is provided at one side of the second substrate facing the first substrate, and wherein the second grating layer comprises a plurality of second light transmission areas and a plurality of second light shielding units arranged to be spaced apart from each other, wherein the second light transmission areas are configured to pass the light from the backlight source through the second light transmission areas and the second light shielding units are configured to reflect the light from the backlight source.

2. The dual view field display panel as claimed in claim 1, wherein the second grating layer comprises a plurality of layers, wherein a first transparent spacer layer is provided between the second grating layer and the first grating layer, and a second transparent spacer layer is provided between any two adjacent layers of the second grating layer.

3. The dual view field display panel as claimed in claim 2, further comprising first display units and second display units, which correspond to the first display regions and the second display regions respectively and are located between the first grating layer and the first transparent spacer layer.

4. The dual view field display panel as claimed in claim 1, wherein the first light shielding unit in the first grating layer is formed by a metal layer deposited on the first substrate through a patterning process.

5. The dual view field display panel as claimed in claim 4, wherein the first grating layer further comprises a first spacing light shielding unit for spacing apart the first display region and the second display region.

6. The dual view field display panel as claimed in claim 5, wherein the first spacing light shielding unit is formed by the metal layer by a same patterning process.

7. The dual view field display panel as claimed in claim 1, wherein the second grating layer further comprises a second spacing light shielding unit for spacing apart the first display region and the second display region.

8. The dual view field display panel as claimed in claim 7, wherein the second light shielding unit and the second spacing light shielding unit are formed by black resin or black metal.

9. The dual view field display panel as claimed in claim 1, wherein the first substrate is an array substrate, and the second substrate is a color filter substrate.

10. The dual view field display panel as claimed in claim 1, wherein the dual view field display panel adopts TN type of pixels.

11. The dual view field display panel as claimed in claim 10, wherein the first grating layer is located in a layer where a common electrode wiring between a glass substrate and an ITO pixel electrode layer of the array substrate and a gate of corresponding TFT transistors are located.

12. The dual view field display panel as claimed in claim 11, wherein patterns of the common electrode wiring, the gate and the first grating layer are formed by a metal layer through a common lithographic process at one time;

wherein the gate and the common electrode wiring are also used as the first light shielding unit, and the first light shielding unit of the first grating layer is electrically connected with an ITO common electrode of the dual view field display panel; or the first light shielding unit and the common electrode wiring are independent from each other, and the first light shielding unit is electrically connected with a pixel electrode of the dual view field display panel.

13. The dual view field display panel as claimed in claim 1, wherein the dual view field display panel adopts ADS type of pixels.

14. The dual view field display panel as claimed in claim 13, wherein the first grating layer is an additional metal layer provided between a glass substrate and an ITO pixel electrode layer of the array substrate, except an ITO common electrode layer.

15. The dual view field display panel as claimed in claim 14, wherein the additional metal layer is a metal layer where a gate or a signal line is located.

16. The dual view field display panel as claimed in claim 15, wherein patterns of the first grating layer and the gate or the signal line are formed by a same metal layer during a same patterning process, wherein the gate or the signal line is also used as the first light shielding unit, and the first light shielding unit in the first grating layer is electrically connected with the ITO common electrode or the ITO pixel electrode.

17. A dual view field display apparatus, comprising the dual view field display panel as claimed in claim 1.

* * * * *